United States Patent [19]

Grilliot

[11] Patent Number: 4,465,197

[45] Date of Patent: Aug. 14, 1984

[54] PHONOGRAPH RECORD HOLDER

[76] Inventor: Marc F. Grilliot, 6116 Little Creek Ct., Huber Heights, Ohio 45424

[21] Appl. No.: 370,165

[22] Filed: Apr. 20, 1982

[51] Int. Cl.³ .............................................. A47G 29/00
[52] U.S. Cl. ...................................... 211/40; 248/97; 248/100; 312/10
[58] Field of Search .................... 211/40; 248/97, 100, 248/340, 341, 215; 312/10; 403/116

[56] References Cited

U.S. PATENT DOCUMENTS

| D. 256,534 | 8/1980 | Bugos | D6/185 |
| 1,077,638 | 11/1913 | Petsche | 312/10 |
| 1,403,751 | 1/1922 | Edstrom | 248/97 |
| 2,917,179 | 12/1959 | Casey et al. | 211/40 |
| 2,959,389 | 11/1960 | Richter et al. | 248/340 |
| 3,186,667 | 6/1965 | Meuer | 248/97 |

FOREIGN PATENT DOCUMENTS 509868  3/1952  Belgium .............................. 248/97

Primary Examiner—J. Franklin Foss
Assistant Examiner—David L. Talbott
Attorney, Agent, or Firm—Louis E. Hay

[57] ABSTRACT

A phonograph record holder having a frame comprising a base element and two substantially flat faced upright elements attached at the lower end to the base element and extending upwardly in parallel spaced apart relationship, each of the inner faces of the upright elements having at least one vertical groove in spaced relationship for receiving and holding a phonograph record jacket in a vertical position with the open end of the jacket on top, and further having means thereon for holding the open end of the jacket and liner in spread-apart position to thereby permit the easy grasping of the contained record and its removal from the jacket and liner.

4 Claims, 4 Drawing Figures

PHONOGRAPH RECORD HOLDER

REFERENCE TO RELATED U.S. PATENTS

U.S. Pat. No. 1,077,638 Filing Cabinet—Petsche—issued Nov. 4, 1913.
U.S. Pat. No. 1,403,751 Bag Holder—Edstrom—issued Jan. 17, 1922.
U.S. Pat. No. 3,186,667 Paper Sack Holder—Meuer—issued June 1, 1965.

BACKGROUND OF THE INVENTION

Phonograph records, and especially the current 12 inch long-play records, normally are packaged in a square jacket which consists of two sheets of thin cardboard in face-to-face relationship, with the edges on three sides bound to be closed, and with the fourth side open. This forms a protective jacket, while at the same time permitting the removal from and the replacement of the record in the jacket. In addition, the better quality records have a thin liner which forms a pocket for receiving the phonograph record and protecting the record grooves from debris which sloughs from the interior of the coarse cardboard.

It is extremely difficult to avoid the occasional and accidental dropping or otherwise damaging a record when removing it from the jacket. The jacket is itself of inconvenient size because it cannot be held in the usual manner for grasping and holding such an object; rather, the jacket must be steadied against the body with one hand, while the other hand reaches into the jacket to extract the record. Since a record should only be handled at the rim in order to avoid finger printing the playing surfaces or getting damaging corrosive perspiration in the playing grooves of the record, a careful user never has a firm grip on a record, especially when holding the record with one hand only. After the record is removed from the jacket to free the second hand for also handling the record, there is less danger of dropping the record; however, when grasping a record at the rim with one hand applying as little pressure as possible, it is very easy to drop a record. A record is easily ruined if it drops in such a manner that the playing surface of the record falls against a hard object and the record grooves are gouged or flattened by the object which was contacted.

SUMMARY OF THE INVENTION

The record holder constituting the present invention consists of a frame in which one or more jackets with record contents may be held in a vertical attitude, and with means thereon for holding the open end of the jacket in a spread-apart position for making it easy to remove a record from its jacket, and to subsequently return the record to the jacket. Since one hand is not required to hold the jacket against the body, the user is able to use both hands for handling the record, and thereby reduce the possibility for the accidental dropping of the record.

BRIEF DESCRIPTION OF THE PREFERRED EMBODIMENT

Figure 1:
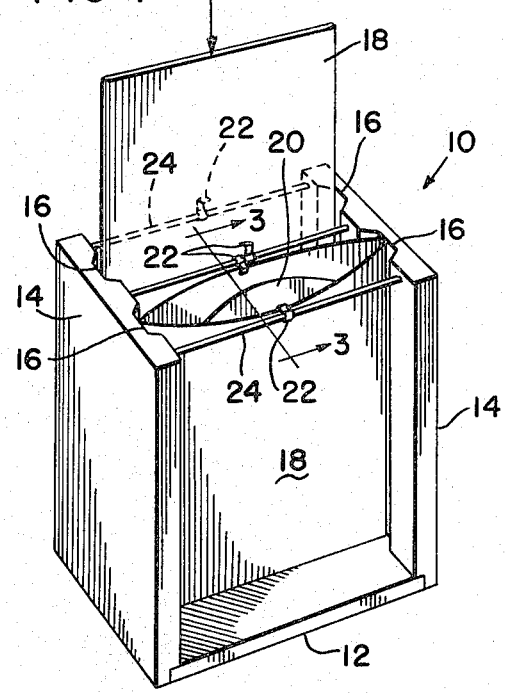
FIG. 1 is a perspective depicting the manner in which the jackets are inserted in the frame, and the manner in which the jackets are held in spread-apart position.
Figure 2:
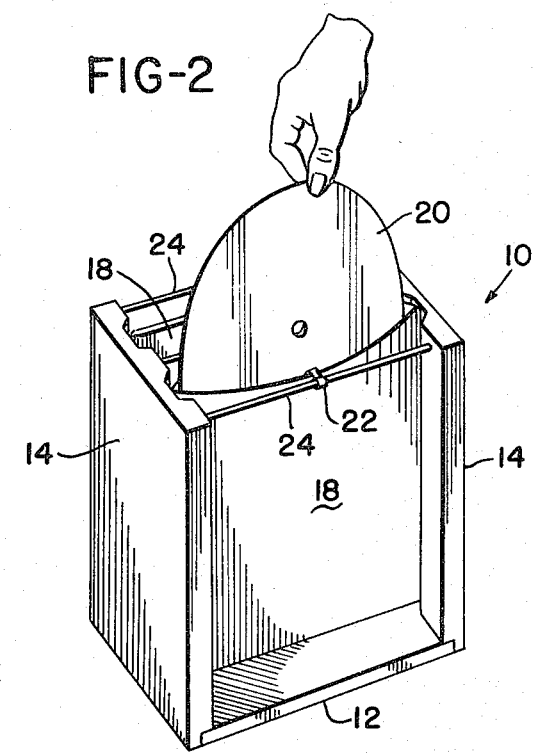
FIG. 2 is a perspective comparable to FIG. 1, and depicting the manner in which the record is removed from, or inserted into a jacket.

As depicted in FIGS. 1 and 2, the phonograph record holder 10 has a base element 12 and two vertical side elements 14, which, at the bottom are joined to the base element and extend vertically in a substantially parallel manner to form a U-shaped frame.

The complete frame may be made in a unitary form if made from a plastic material, as by the injection molding process; or, it may be made in three parts, as depicted, and joined by the use of screws, or by the use of contact cement, for example. If made in three parts, an excellent material is vinyl covered flake board which is widely used at the present time to produce wood grained objects which do not require great structural strength.

Each of the vertical side elements 14 has at least one vertical groove 16 in register with each other for slidably receiving and positioning a record jacket 18 holding a record 20. The number of grooves is dependent on the desired number of jackets to be retained. The depicted holder is made for two jackets, and has two grooves in each vertical side element 14. Within the scope of the invention, a holder may be made for a single jacket requiring one groove in each vertical side element; or, it may be built for more than the two jackets depicted, with a corresponding increase in the number of grooves. Also, outwardly extending vertical guide strips may be substituted for the grooves as the means for holding the jackets in spaced alignment.

Figure 3:
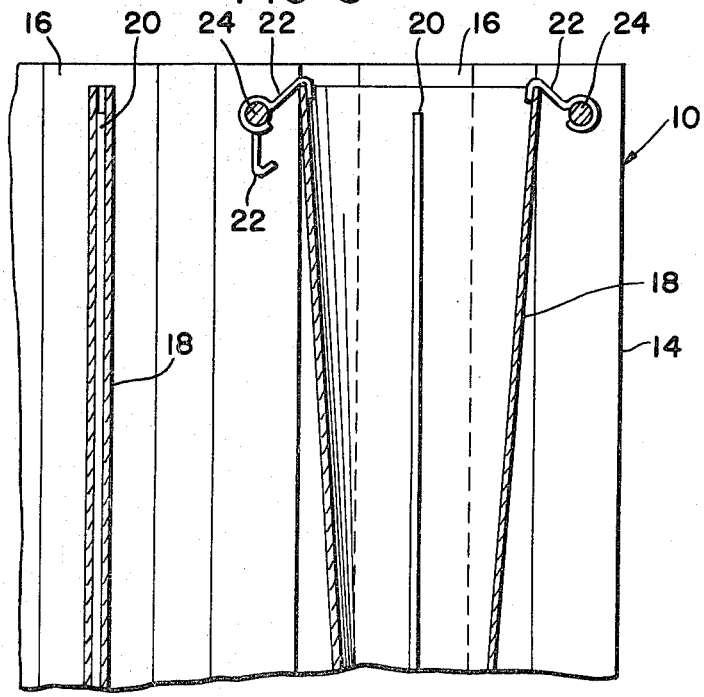
FIG. 3 is an enlarged vertical view taken along line 3—3 on FIG. 1 and depicting one jacket in its normally closed position, and a second jacket in spread-apart position; and, FIG. 4 is one type of suitable clamp or hook which pivots on a rod supported at the upper end of the frame.
Figure 4:
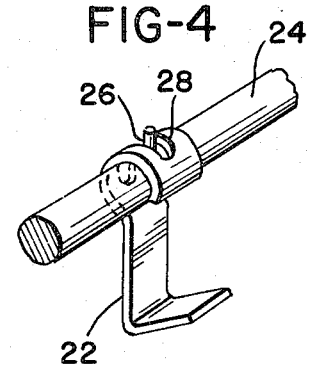

The phonograph record holder is provided with means for releasably holding the record jacket open as most clearly depicted in FIGS. 1 and 3. One convenient method is to use swing hooks 22 which are pivotally supported on rods 24. The rods may be wooden dowel rods supported at the upper end of the vertical side elements 14. One advantage of wooden dowel rods is that they may be finished in a color which will blend with the frame portion of the assembly. If desired, the swing hooks may be laterally positioned on the rods 24 by means of a pin 26 which is in engagement with slot 28 in the swing hooks. The pin may be pressed into a drilled hole in the rod, or attached by other means. Although convenient, the pin and slot may be omitted to reduce the production costs.

The number of rods and swing hooks is dependent on the jacket capacity of the holder. As depicted, it requires one more rod than the number of jackets, and with two swing hooks for each jacket. Other holding means may be used within the scope of the invention. For example, clothes pins or paper clips may be used to hold the jacket in spread-apart position in the holder.

FIG. 3 depicts one jacket in spread-apart position which is maintained by two swing hooks, and a second jacket which has not been spread, and with the swing hooks not in engagement with the closed jacket.

It is to be understood that the embodiment of the present invention as shown and described is to be regarded merely as illustrative, and that the invention is susceptible to variations, modifications and changes, without regard to specific construction methods within the scope of the appended claims.

I claim:

1. A holder for releasably holding a phonograph record jacket in an upright position with the open end of said jacket at the top, said holder comprising:
   (a) a frame having a flat base and two vertical substantially parallel sides forming a U-shaped structure, said frame being adapted for slidably receiving and positioning said jacket in an upright attitude; and,
   (b) holding means supported by said frame and adapted for releasably holding the open end of said jacket in spread-apart position, said holding means being swing hooks pivotally supported on rods, the ends of which are joined to the vertical sides of said frame.

2. A holder for releasably holding a phonograph record jacket in an upright position with the open end of said jacket at the top, said holder comprising:
   (a) a frame having a flat base and two vertical substantially parallel sides forming a U-shaped structure, said frame being adapted for slidably receiving and positioning said jacket in an upright attitude; and,
   (b) holding means supported by said frame and adapted for releasably holding the open end of said jacket in spread-apart position, said holding means being swing hooks pivotally supported on rods, the ends of which are joined to the vertical sides of said frame, said swing hooks being provided with means for preventing movement of said swing hooks longitudinally on said rods.

3. A holder for releasably holding a plurality of phonograph record jackets in an upright position with the open end of said jackets at the top, said holder comprising:
   (a) a frame having a flat base and two vertical substantially parallel sides forming a U-shaped structure, said frame being adapted for slidably receiving and positioning a plurality of said jackets in spaced-apart upright attitude; and,
   (b) holding means supported by said frame and adapted for releasably holding the open end on each of said jackets in spread-apart position, said holding means being swing hooks pivotally supported on rods spaced on each side of said jackets, the ends of said rods being joined to the vertical sides of said frame.

4. A holder for releasably holding a plurality of phonograph record jackets in an upright position with the open end of said jackets at the top, said holder comprising:
   (a) a frame having a flat base and two vertical substantially parallel sides forming a U-shaped structure, said frame being adapted for slidably receiving and positioning a plurality of said jackets in spaced-apart upright attitude; and,
   (b) holding means supported by said frame and adapted for releasably holding the open end on each of said jackets in spread-apart position, said holding means being swing hooks pivotally supported on rods spaced on each side of said jackets, the ends of said rods being joined to the vertical sides of said frame, said swing hooks being provided with means for preventing movement of said swing hooks longitudinally on said rods.

* * * * *